United States Patent

Bleckmann et al.

[11] Patent Number: 6,008,638
[45] Date of Patent: Dec. 28, 1999

[54] ACTIVE MOTION SENSOR HAVING POST-ASSEMBLY AIR SLOT SIGNAL ADJUSTMENT

[75] Inventors: Hans-Wilhelm Bleckmann, Nauheim; Heinz Loreck, Idstein; Peter Lohberg, Friedrichsdorf, all of Germany

[73] Assignee: ITT Manufacturing Enterprises Inc., Wilmington, Del.

[21] Appl. No.: 08/817,002

[22] PCT Filed: Sep. 19, 1995

[86] PCT No.: PCT/EP95/03679

§ 371 Date: Jun. 20, 1997

§ 102(e) Date: Jun. 20, 1997

[87] PCT Pub. No.: WO96/10751

PCT Pub. Date: Apr. 11, 1996

[30] Foreign Application Priority Data

Sep. 30, 1994 [DE] Germany .............................. 44 349 77

[51] Int. Cl.⁶ .............................. G01P 21/02; G01P 3/48; G01B 7/14

[52] U.S. Cl. .................... 324/166; 324/173; 324/207.2; 324/207.26; 324/202

[58] Field of Search .................................. 324/160, 163, 324/166, 173, 174, 207.12, 207.2, 207.21, 207.25, 207.26, 202; 73/514.39; 303/138; 340/671; 361/239, 240

[56] References Cited

U.S. PATENT DOCUMENTS 3,923,030  12/1975  Luteran .
4,293,814  10/1981  Boyer ............................... 324/207.2 X
4,902,970  2/1990  Suquet ..................................... 324/173
5,043,658  8/1991  Braschel et al. ..................... 324/163 X

FOREIGN PATENT DOCUMENTS

| 0046006 | 2/1982 | European Pat. Off. . |
| 0569924 | 11/1993 | European Pat. Off. . |
| 2405416 | 9/1974 | Germany . |
| 2235056 | 9/1975 | Germany . |
| 3226073 | 4/1983 | Germany . |
| 3433777 | 3/1986 | Germany . |
| 3941473 | 6/1991 | Germany . |
| 4033740 | 4/1992 | Germany . |
| 4131128 | 2/1993 | Germany . |
| 4216142 | 11/1993 | Germany . |
| 4228888 | 3/1994 | Germany . |
| 2240848 | 8/1991 | United Kingdom . |
| WO 9610751 | 4/1996 | WIPO . |

OTHER PUBLICATIONS

Japanese Abstract Application No. JP860245445. Publication date May 2, 1988.
Japanese Abstract Application No. JP900299140. Publication date Jun. 19, 1992.
Article "Automatic Testing of Sensors in ABS Systems"; Technisches Messen 58 (1991) 7/8.
Article "Drehzahlerfassung mit Differenz–Hall–IC"; Elektronik Apr. 1991.

*Primary Examiner*—Gerard Strecker
*Attorney, Agent, or Firm*—Rader, Fishman & Grauer PLLC

[57] ABSTRACT

A rotational speed sensor system which uses the sensor and a sensor electronic circuit to test the air slot between the speed sensor and an encoder to determine if the air slot falls within acceptable limits.

6 Claims, 1 Drawing Sheet

ACTIVE MOTION SENSOR HAVING POST-ASSEMBLY AIR SLOT SIGNAL ADJUSTMENT

TECHNICAL FIELD

The present invention relates to sensor elements for determining displacements, motional speeds, and rotational speeds in the field of mechanical engineering, in particular in the automotive vehicle industry and, more particularly, in the range of application of controlled brakes, for determining the rotational speeds of wheels.

BACKGROUND OF THE INVENTION

Sensor devices for determining the rotational speeds of wheels are known. Normally, the devices include an incremental encoder which is mechanically coupled to the rotating part, and a sensor which scans the encoder in a non-contact manner. Ferromagnetic toothed wheels or ferromagnetic discs are used as encoders. When sensors are used in wheel bearings, it is customary to employ magnetized structures, for example, an annular or circular arrangement of adjacent north and south poles, embedded in a mechanical carrier.

It is most common to use so-called "passive" sensors according to the reluctance principle. The sensors include a combination of a copper coil with a permanent magnet which is magnetically coupled to the encoder. The encoder modulates the magnetic coupling reluctance synchronously with movement. An alternating voltage, synchronous with movement, is induced in the copper coil in the way of a dynamo, and the frequency of the alternating voltage is evaluated as a measured quantity. The induced signal voltage fades away during standstill and will possibly adopt undesirably high values at high speeds.

To avoid such high voltages, so-called "active" sensors, have been developed. Sensors of this type are described in German patent application No. 41 35 789, for example. The sensors are a combination of a magnetostatically sensitive element and a permanent magnet which is magnetically coupled to the encoder. In this arrangement also, the encoder modulates the magnetic coupling reluctance or, in the case of the magnetized encoder, the field direction, synchronously with movement. The sensor element responds to the variations of the flux density or to the movement of a field vector. Examples in the art of such basic elements are Hall probes or magneto-resistive permalloy structures. The signal amplitude of active sensors of this type is independent of the speed of the encoder. Active sensors require for operation an electric energy which is supplied by an electronic controller. Technical methods involving a three-conductor feed-in or a two-conductor feed-in are known in the art. The three-conductor version supplies a signal voltage to the input of the electronic controller, while the two-conductor version furnishes a signal current.

Active sensors of the current type limit the sensor information available to them to one single parameter, the signal frequency. An internal amplifier trigger circuit generates a binary output signal with two constant amplitude values in the area of a defined, permissible air slot between the sensor and encoder, irrespective of the size of the air slot. The change in flanks of the amplitude values is evaluated, but the signal itself does not indicate the changed values. However, the signal discontinues abruptly when the permissible air slot size is exceeded because in this event the induced sinusoidal input signal falls short of a sensor-inherent hysteresis threshold, and the sensor stops responding.

A device for the adjustment of the air slot size, as disclosed in German patent application No. 40 33 064, ensures a proper mounting position of the sensor and maintains the permissible air slot size. The sensor is fitted in a sleeve-shaped mounting support and is urged by a compression spring with a flange against a corresponding flange of the mounting support in the direction of the encoder. The flange of the sensor includes a plurality of similar, axial teeth, while the flange of the mounting support includes two groups of axial indentations, the number of which corresponds to the number of teeth. When the sensor is installed, its teeth are placed in the group of the deep indentations, and the assembly of the mounting support is so that the sensor is initially in contact with the encoder. Subsequently, the teeth are locked in the group of the flat indentations so that a defined size of the air slot between the sensor and encoder is adjusted. The correct mounting position cannot be verified after the assembly is completed.

When an active sensor, due to misassembly, is inadvertently operated at the limits of its maximum permissible air slot, an appropriately great dynamic deformation of the kinematics between the sensor and encoder will possibly increase the air slot so that the permissible air slot size is exceeded and the output signal is interrupted.

Therefore, an object of the present invention is to render testing of the size of the air slot possible even after the assembly of the sensor.

This object is achieved by providing an integrated electronic circuit which varies the output signals which are transmitted from the sensor to the electronic controller as a function of the existing air slot size. Evaluation of these output signals by the electronic controller will permit testing the air slot size during the entire operating time of the sensor even after the assembly of the sensor, without using mechanical means.

If, for example, the magnetic field-responsive input signal is amplified by the integrated circuit so that the peaks of the signals are clipped when the air slot size is smaller than the permissible air slot size by a certain amount, the air slot size may be concluded from the width of the resulting plateau, i.e. in the event of sinusoidal output signals, or upon the attaining of a constant amplitude in the event of square-wave or other angular output signals.

Another practical possibility involves generating a second output signal which may be superimposed on the speed-responsive output signal in order to reduce the total number of electrical lines. The second output signal, which is responsive to the air slot size, will be influenced by the air slot size either in terms of its amplitude, frequency, or the shape of its curve. When superimposed on the speed-responsive output signal, the second output signal may be filtered out in a known fashion in the electronic controller.

The idea of the present invention will be explained in detail in the following by way of three embodiments, making reference to four Figures of the accompanying drawing.

DETAILED DESCRIPTION OF THE PREFERRED EMBODIMENTS

Figure 1:
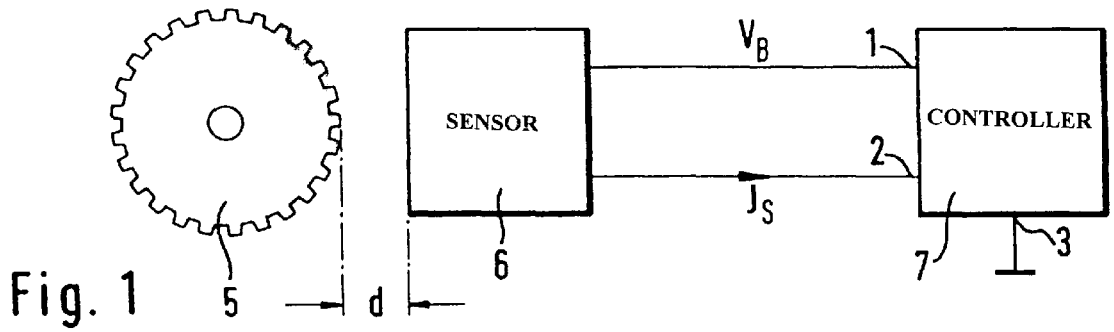
FIG. 1 is a schematic view of a sensor arrangement including an encoder, a sensor and an electronic controller.

In the arrangement of FIG. 1, the encoder 5 is represented as a toothed wheel. However, the use of encoders with adjacent magnetic north and south poles is not excluded. Also, the present invention will be explained by way of example of a sensor with a two-conductor feed-in. However, sensors with a three-conductor feed-in are also possible.

As can be seen in FIG. 1, the active sensor 6 is connected to an electronic controller 7 by way of a two-wire connection. The sensor 6 is supplied with an operating voltage $V_B$ as measured between pin 1 and pin 3 by controller 7 and returns a signal current $J_s$ to the controller by way of pin 2. Satisfactory operation of the sensor 6 depends on the fact whether the air slot size 'd' between the sensor 6 and the encoder 5 is within permissible limits.

Figure 2:
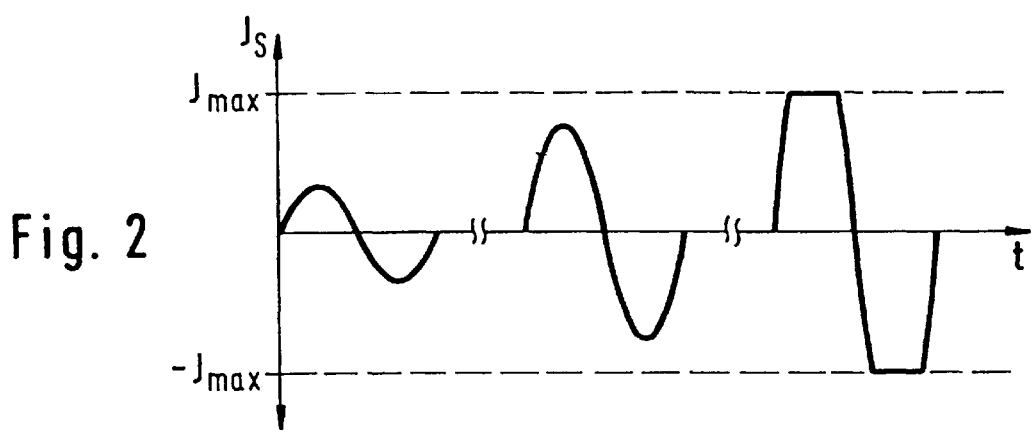
FIG. 2 shows the course of the curve of a sinusoidal output signal with an amplitude limitation.

In a first embodiment of the present invention according to FIG. 2, a sinusoidal input signal, which is produced by the effect of the encoder 5 on a magnetic-field sensitive sensor element of sensor 6 and has a peak value varying with the air slot size 'd', is amplified by an electronic circuit (not shown) integrated into the sensor, and is converted into the signal current $J_s$. The amplitude range of the signal current $J_s$ is limited to the value $J_{max}$ so that the sinusoidal curve shape adopts a course similar to a square wave, given a sufficient proximity between the sensor 6 and encoder 5. This is accomplished by the electronic circuit integrated into the sensor having a suitable amplifying stage, such as an amplifier, and a suitable current limiting stage, such as a clipping circuit, conventionally used in the art. A stepwise reduction of the air slot size 'd' is shown from the left to the right side in the drawing. After the assembly of the sensor 6, the amplitude level or the extent of the amplitude limitation of the signal current $J_s$ permits checking whether there is a sufficient air slot reserve, i.e., whether an appropriate input signal will be ensured even in the event of dynamic deformation of the kinematics between the sensor 6 and encoder 5.

Figure 3:
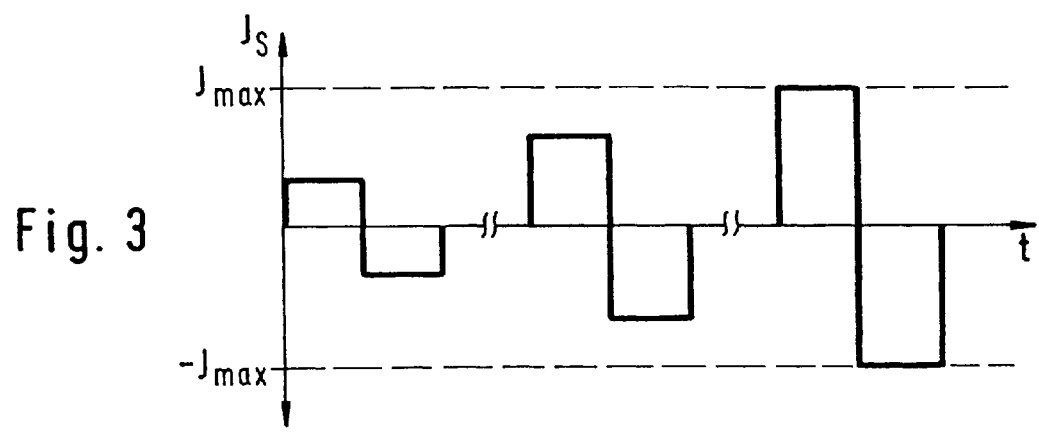
FIG. 3 shows a corresponding course of curve for square-wave output signals.

A second embodiment of the present invention is shown in FIG. 3. The electronic circuit integrated in the sensor is so configured that the curve of the signal current $J_s$ has always a square wave shape. However, the amplitude of the square wave is variable as a function of the amplitude of the sinusoidal input signal, which is produced by the effect of the encoder 5 at the magnetic-field sensitive sensor 6 and has a peak value that varies with the air slot size 'd'. The drawing shows, again from the left to the right, a stepwise reduction of the air slot size 'd'. After the assembly of the sensor 6, the amplitude level permits checking whether there is a sufficient air slot reserve. In this instance, the amplification of the input signal and the amplitude limitation of the signal current $J_s$ can be conformed to one another so that the air slot size 'd' is optimal when the amplitude of the square-wave curve of the signal current $J_s$ adopts its maximum value $J_{max}$ and does not change in consequence of a closer approach of the sensor 6 to the encoder 5.

Figure 4:
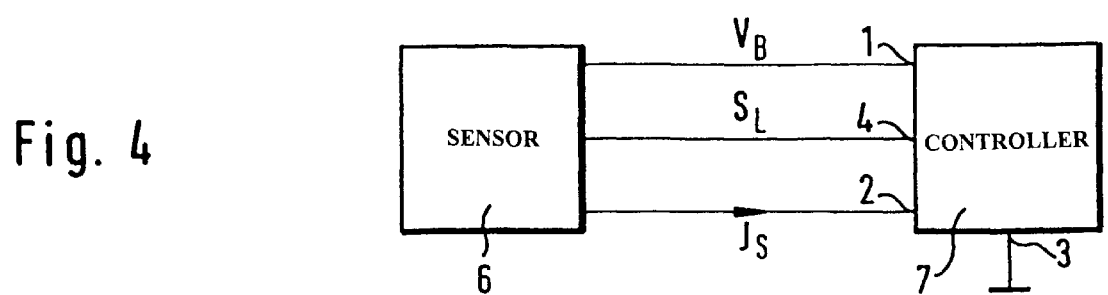
FIG. 4 is a schematic view of an arrangement wherein an additional air-slot responsive output signal is sent from the sensor to the controller.

In the embodiment of FIG. 4, the electronic circuit integrated in the sensor is so configured that the signal current $J_s$ always has a square-wave curve shape with a constant amplitude, as known per se from the state of the art. However, a signal $S_L$ is additionally sent to the controller 7 which includes an information about the intensity of the sinusoidal input signal. The input signal is produced by the interaction of the encoder 5 and the magnetic-field responsive sensor 6 and has a peak value which is variable as a function of the air slot size 'd'. In the drawing, the output signal $S_L$ is conducted by way of a line to pin 4 of the controller. However, it is also in the spirit of the present invention to superimpose the output signal $S_L$ on the signal current $J_s$. In a three-conductor version of the sensor 6 (not shown), the signal $S_L$ is superimposed on the signal voltage which transmits the information about the speed of the encoder to the controller 7.

Depending on the embodiment of the present invention chosen, the output signal $S_L$ can have a constant amplitude, the value of the amplitude coding the air slot size 'd'. Alternatively, the output signal may occur with a constant amplitude when a defined intensity threshold of the magnetic-field responsive input signal falls short of the sensor's inherent hysteresis threshold. Finally, it is also possible to superimpose an output signal $S_L$ which is evidently different in its curve shape or frequency, on the signal current $J_s$ or, optionally, the signal voltage. The output signal $S_L$ can be filtered out in the controller 7 receiving it by known filtering methods.

We claim:

1. An active sensor system, comprising:

a signal encoder;

an active sensor for generating at least one output signal indicative of a distance between the encoder and the sensor, the output signal having an amplitude which does not vary with the relative speed between said encoder and said sensor;

an electronic controller coupled to said sensor; and an integrated electronic circuit within the sensor for varying the strength or the shape of said at least one sensor output signal indicative of the distance between the sensor and the encoder such that a sensor-inherent limitation of amplitude clips the extreme portion of said at least one sensor output signal whenever the distance between the sensor and the encoder is less than a predefined distance.

2. The sensor system of claim 1, wherein said at least one output signal is generally sinusoidal, and wherein a width of a plateau portion of the sinusoidal signal, which is caused by clipping of the extreme portions of the sinusoidal output signal, corresponds with the distance between the sensor and the encoder.

3. The sensor system of claim 1 wherein said at least one of said sensor output signals is generally a square wave and has an amplitude that remains constant irrespective of relative speed between the encoder and said sensor.

4. The sensor system of claim 1, wherein said at least one of said sensor output signals includes at least two sensor output signals, one of said sensor output signals being variable as a function of the distance between the sensor and the encoder.

5. The sensor system of claim 4 wherein one of said at least two sensor output signals is superimposed on the other of said at least two sensor output signals.

6. The sensor system of claim 5 wherein said at least one of said sensor output signals exhibits a constant value whenever the amplitude of the signal generated by the sensor falls short of a predefined value.

* * * * *